(12) United States Patent
Nowak et al.

(10) Patent No.: US 12,485,733 B2
(45) Date of Patent: Dec. 2, 2025

(54) VEHICLE COMPARTMENT WITH SMART GLASS CONTROLLED BY A LIGHT SENSOR

(71) Applicant: Volvo Construction Equipment AB, Eskilstuna (SE)

(72) Inventors: Piotr Nowak, Rzeszow (PL); Andrzej Stochmal, Wroclaw Dolnoslaskie (PL)

(73) Assignee: Volvo Construction Equipment AB, Eskilstuna (SE)

( * ) Notice: Subject to any disclaimer, the term of this patent is extended or adjusted under 35 U.S.C. 154(b) by 387 days.

(21) Appl. No.: 17/990,795

(22) Filed: Nov. 21, 2022

(65) Prior Publication Data

US 2023/0158864 A1    May 25, 2023

(51) Int. Cl.
*B60J 3/04* (2006.01)
*G01J 1/02* (2006.01)

(52) U.S. Cl.
CPC ............... *B60J 3/04* (2013.01); *G01J 1/0238* (2013.01); *G01J 1/0266* (2013.01)

(58) Field of Classification Search
CPC ... B60J 3/04; B60J 3/007; B60J 3/0278; B60J 1/02; B60J 1/2011; G01J 1/0238; G01J 1/0266; B60K 35/415; B60K 35/60
USPC ....... 296/97.2, 96.19, 97.1; 359/601; 701/36
See application file for complete search history.

(56) References Cited

U.S. PATENT DOCUMENTS

| | | | |
|---|---|---|---|
| 5,298,732 A * | 3/1994 | Chen | B60J 3/04 351/44 |
| 10,319,272 B1 * | 6/2019 | Carter | B60K 35/53 |
| 2003/0169213 A1 * | 9/2003 | Spero | B60K 35/415 345/7 |
| 2006/0158715 A1 * | 7/2006 | Furusawa | B60J 3/04 359/265 |
| 2006/0279101 A1 * | 12/2006 | Sahara | B60J 3/02 296/97.8 |
| 2009/0204291 A1 * | 8/2009 | Cernasov | G02C 7/101 359/601 |
| 2016/0288627 A1 * | 10/2016 | Trinh | B60J 3/0291 |
| 2018/0128044 A1 * | 5/2018 | Ochiai | G02F 1/137 |

(Continued)

FOREIGN PATENT DOCUMENTS

| | | |
|---|---|---|
| DE | 10057795 A1 | 5/2002 |
| DE | 102005007427 A1 | 8/2006 |
| JP | 2002067690 A | 3/2002 |

(Continued)

OTHER PUBLICATIONS

Kaneko et al. (JP 2003165334 A), machine translation (Year: 2003).*

(Continued)

*Primary Examiner* — Amy R Weisberg
*Assistant Examiner* — Wenwei Zhuo
(74) *Attorney, Agent, or Firm* — Sage Patent Group

(57) ABSTRACT

A vehicle compartment for a vehicle includes a screen through which an occupant can view portions of the environment ambient of said vehicle compartment, at least one panel, adapted to adjust the light intensity of light falling into said vehicle compartment via at least a portion of said screen, a light sensor and a control unit adapted to adjust the panel to thereby adjust the light intensity of light falling into said vehicle compartment in response to a signal issued from the light sensor.

10 Claims, 2 Drawing Sheets

(56) References Cited

U.S. PATENT DOCUMENTS

2019/0168586 A1\* 6/2019 Paepcke ............... G09G 3/3406

FOREIGN PATENT DOCUMENTS

| JP | 2003159942 A | | 6/2003 |
|---|---|---|---|
| JP | 2003165334 A | \* | 6/2003 |
| JP | 2008044603 A | | 2/2008 |
| WO | WO-2017088963 A1 | \* | 6/2017 |

OTHER PUBLICATIONS

Extended European Search Report dated May 6, 2022 for European Patent Application No. 21209509.5, 8 pages.

\* cited by examiner

VEHICLE COMPARTMENT WITH SMART GLASS CONTROLLED BY A LIGHT SENSOR

CROSS REFERENCE TO RELATED APPLICATIONS

The present application claims benefit of priority to European Patent Application No. 21209509.5, filed Nov. 22, 2021, and is assigned to the same assignee as the present application and is incorporated herein by reference in its entirety.

TECHNICAL FIELD

The disclosure relates to a vehicle compartment with a system for mitigating blinding of a vehicle occupant. Specifically, the disclosure can be applied in any vehicle with a vehicle compartment in which a driver or passenger risks being blinded by the sun, such as trucks, buses, construction equipment and cars.

BACKGROUND

When operating or riding a vehicle, an occupant operating or riding the vehicle stands the risk of being blinded by the sun. A common solution to the problem is to provide a manually operated sun visor, curtain or similar device in the vehicle. Such manually operated devices requires an effort by the occupant, thereby distracting him/her. Further, the occupant may enable it/fold it down too late or not at all. Also, there is a risk that the device remains enabled/folded down too long, thereby reducing the field of view of the occupant when not needed.

WO201788963A1 discloses an automated approach for mitigating light sources blinding a passenger. Specifically, the solution is based on use of screens with electrically controllable light transmission properties, such as a screen or layer of electrochromic glass or liquid crystal layer or other type of electrically switchable smart glass. The proposed solution monitors occurrence of a glare situation, for example using optical sensors. Alternatively, the system can be manually enabled by a signal from a manual control element. When a glare situation is detected, a transmittance of the screen, in at least parts of the screen, is reduced to reduce the object's brightness perceivable by the passenger. A drawback of this system is that it is complex.

DE102005007427 discloses an automatic sun visor system for a vehicle. The system comprises a plurality of segments comprising, e.g., a smart film (SPD or PDLC film) which may be arranged on/at a windscreen. The transparency of each segment can be set individually and is set based on input from sensors, such as a light sensor. The light sensor is positioned on the outside of the vehicle. The control of the segments is further based on input concerning the position, more specifically the height, of the eyes of a person sitting in the vehicle, which may be detected by sensors inside the vehicle. DE10057795 discloses an automatic sun visor system for a vehicle. The system comprises a smart panel. The transparency of the panel may be adjusted automatically based on input from a light sensor. The panel is further controlled based on the head position of a driver and the position and direction of the vehicle. A drawback of this system is that it is complex.

SUMMARY

An object of the disclosure is to provide a simple automated system for mitigating blinding of a vehicle occupant by the sun. According to a first aspect of the present disclosure, this and other objects are achieved by a vehicle compartment for a vehicle, said vehicle compartment being adapted to accommodate an occupant of said vehicle. The vehicle compartment has a vertical extent in a vertical direction and comprises a screen through which the occupant can view at least portions of the environment ambient of said vehicle compartment. The vehicle compartment further comprises a panel assembly comprising at least one panel. Each panel in said panel assembly is adapted to adjust the light intensity of light falling into said vehicle compartment via at least a portion of said screen. The vehicle compartment further comprises a light sensor adapted to determine an intensity of light falling onto said light sensor via said screen. Also, the vehicle compartment comprises a control unit adapted to adjust at least one, preferably each, panel in said panel assembly, to thereby adjust the light intensity of light falling into said vehicle compartment via at least a portion of said screen, in response to a signal issued from the light sensor. The vehicle compartment further comprises a seat for the occupant, said seat being associated with a vertical eye position range indicating within which vertical eye position range, in said vertical direction, the eyes of said occupant are expected to be located when said occupant occupies said seat. The light sensor is located below, in said vertical direction, said vertical eye position range within a range of 10-20 cm. Further, said seat (8) comprises a main body (12) and a headrest (13), wherein said headrest (13) is adapted to receive at least a portion of the head of said occupant. Also, either:

a) said headrest (13) comprises a proximal headrest portion (14) and a distal headrest portion (15), wherein said distal headrest portion (15) is located further away from said main body (12) than said proximal headrest portion (14) is, as measured in said vertical direction (2), said light sensor (6) being attached to said proximal headrest portion (14), or (b) said main body (12) comprises a backrest (16) and said light sensor (6) is attached to said backrest (16).

As incoming sunlight shines towards the occupant, an upper portion of the vehicle compartment normally shades the occupant for some time until the shadow on the occupant moves upward as the sun moves to a lower incoming angle relative the travelling direction of the vehicle. Hence, the sunlit region of the compartment rises within the vehicle compartment until it finally approaches the eyes of the occupant and blinds the occupant. By providing a light sensor below, in said vertical direction, said vertical eye position range, the light sensor will receive the incoming sunlight before it risks blinding the occupant. Thereby, a simple and efficient means of mitigating blinding is provided.

The location of the light sensor below said vertical eye position range within a range of 10-20 cm has shown good results for sensing incoming light before it blinds the occupant. The provision of a headrest on the seat enables better control of the position of the head of the occupant during travel and thus enabling a more predictable result of the blinding prediction.

By attaching the light sensor to the backrest, the light sensor will move together with the backrest as the occupant moves the seat/backrest, for example by forward/rear adjustment or by rotation of the whole seat 180 degrees. Hence, the light sensing performed by the light sensor will adapt to the viewing direction and position/orientation of the occupant, thereby improving reliability and consistency of light measurements.

The vehicle compartment may further comprise a longitudinal extent in a longitudinal direction being parallel to an intended direction of travel of said vehicle, wherein the seat is associated with a longitudinal eye position range indicating within which longitudinal eye position range, in said longitudinal direction, the eyes of said occupant are expected to be located when said occupant occupies said seat. Also, the light sensor may be located behind, in said longitudinal direction, said longitudinal eye position range.

By locating the light sensor behind, in said longitudinal direction, said longitudinal eye position range, the light detection is made at a position both behind and below the eyes of the occupant, the risk of the sensor getting covered by the arms of the occupant is reduced, thus increasing reliability of the light sensing.

The headrest may be vertically moveable relative to said main body.

The vertical movability of the headrest enables it to better support and position the head of the occupant, thus enabling a more predictable result of the blinding prediction.

The backrest may comprise an upper backrest portion in said vertical direction, wherein the light sensor is attached to said upper backrest portion.

By attaching the light sensor to the upper backrest portion, the light sensor is located below said vertical eye position range, close enough to the occupant's eyes to sense a change between a shaded situation and a sunlit situation, which in turn enables an automated activation of the sunblind prior to the occupant being blinded by the sun.

Each panel in said panel assembly may have an adjustable transparency to thereby be adapted to adjust the light intensity of light falling into said vehicle compartment via at least a portion of said screen. The control unit is adapted to adjust the transparency of each panel in said panel assembly to thereby adjust the light intensity of light falling into said vehicle compartment via at least a portion of said screen, in response to a signal issued from the light sensor. The controller thus uses information from the light sensor to detect a change from a shaded situation to a sunlit situation, and subsequently lowers the intensity of light falling into the vehicle compartment. The provision of a plurality of panels individually controllable by the control unit, enables not only varying the light intensity of light passing the panel assembly, but also enables varying what portions of the vehicle compartment the panel assembly shades by selectively activating individual panels to limit light transmission only through the activated panels whilst light is free to pass through the other panels.

Each panel in said panel assembly may be located on at least a portion of said screen. Locating the panels(s) on the screen, enables easy attachment of the panels to the vehicle/vehicle compartment by simply attaching the screen to the vehicle compartment.

The vehicle compartment may comprise a set of screens, said set of screens comprising at least two screens, through each one of which the occupant is able to view at least portions of the environment ambient of said vehicle compartment. Said vehicle compartment may further comprise a panel assembly for each screen in said set of screens, said panel assembly comprising at least a panel, located on at least a portion of said screen, each panel in said panel assembly being adapted to adjust the light intensity of light falling into said vehicle compartment via at least a portion of said screen. The provision of multiple screens enables use of screens in multiple viewing directions of the vehicle for shielding an occupant from incoming light from different viewing directions.

The vehicle compartment may comprise a condition sensor adapted to issue a condition signal to said control unit, said condition signal being indicative of which screen in said set of screens the occupant of said seat is currently facing, said control unit being adapted to adjust each panel in said panel assembly associated with the screen that the occupant of said seat is currently facing, to thereby adjust the light intensity of light falling into said vehicle compartment via at least a portion of that screen, in response to a signal issued from the light sensor.

The condition sensor enables control of only those panels which are in the direction which the occupant is currently facing such that adjustment of light transmittance needs not be made in all directions simultaneously but only in the direction the occupant faces.

The seat may be pivotable around a pivot axis parallel to said vertical direction such that an angular position of said seat is alterable. The condition sensor is adapted to determine said angular position and to issue said condition signal in response to said determined angular position. The angular position of the seat typically corresponds to the viewing direction of the occupant, thereby enabling an easy and reliable means for estimating the viewing direction of the occupant seated in the seat.

A further aspect of the present disclosure relates to a vehicle comprising a vehicle compartment as described above.

BRIEF DESCRIPTION OF THE DRAWINGS

Example embodiments of the disclosure will below be described with reference to the appended drawings.

DETAILED DESCRIPTION OF EXAMPLE EMBODIMENTS OF THE DISCLOSURE

A first embodiment of a vehicle compartment is hereinafter described with reference to FIGS. 1-4. Although FIG. 3 depicts a vehicle in the form of a truck, it should be understood the disclosure is equally well applicable for many other types of vehicles, such as buses, construction equipment and cars, including autonomous cars and buses.

Figure 1:
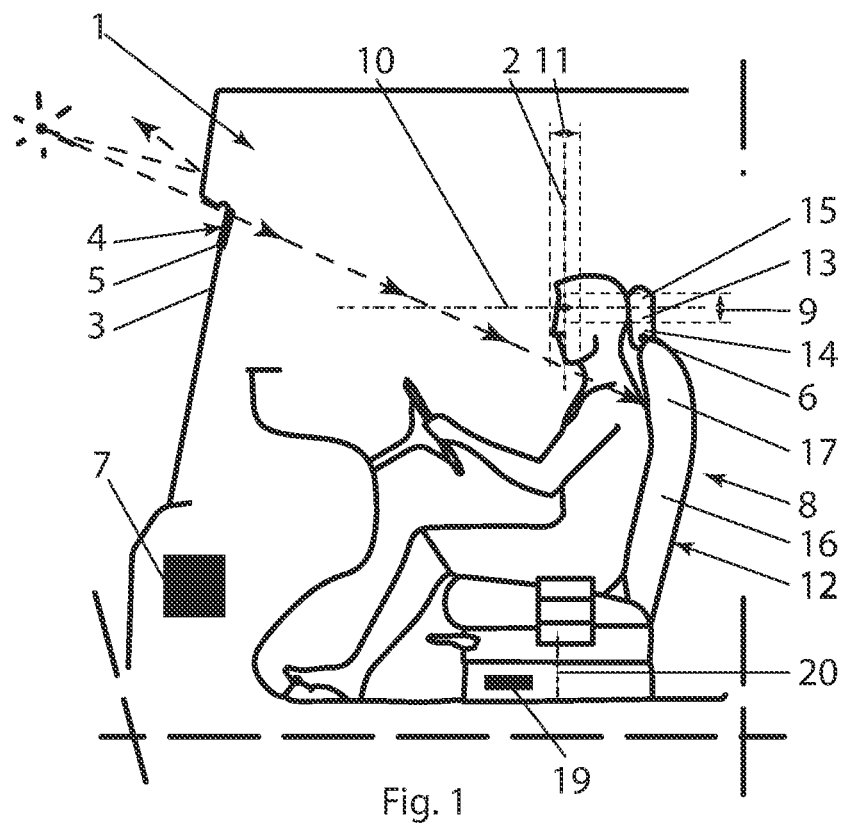
FIG. 1 is a side view of a vehicle compartment with incoming sunlight from a higher position from which the sun is not capable of blinding the occupant.
Figure 2:
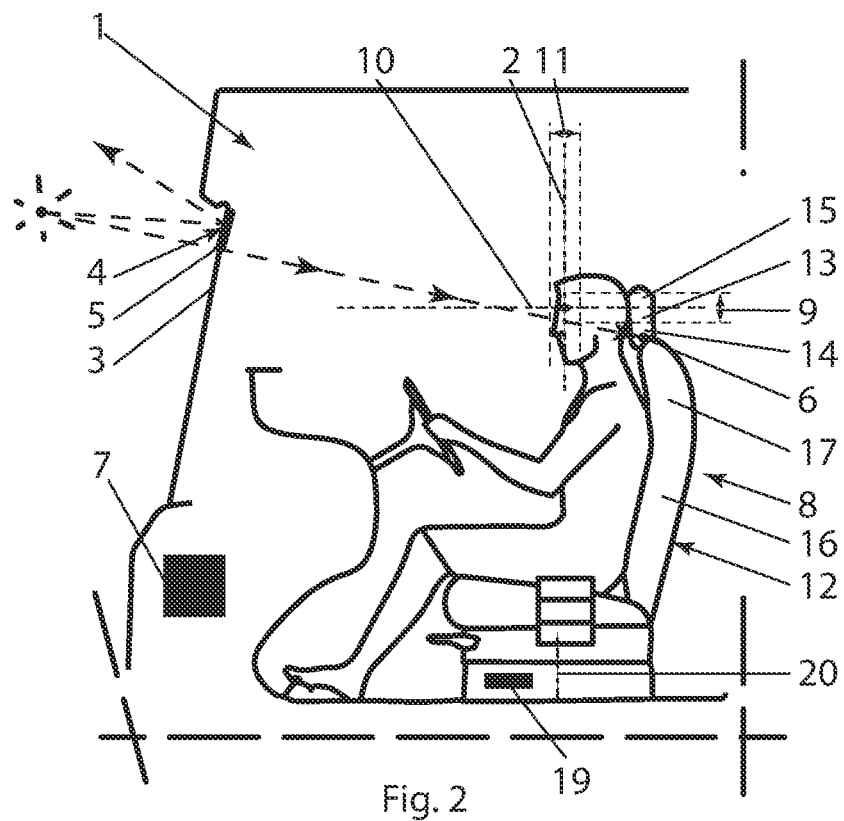
FIG. 2 is a side view of the vehicle compartment of FIG. 1, however shown with incoming sunlight from a lower position from which the sun risks blinding the occupant. Here, the light sensor has detected a change from being shaded to being exposed to incoming sunlight and the control unit has adjusted at least one panel in the panel assembly accordingly to thereby adjust (lower) the light intensity of light falling into said vehicle compartment to mitigate blinding by incoming light.
Figure 3:
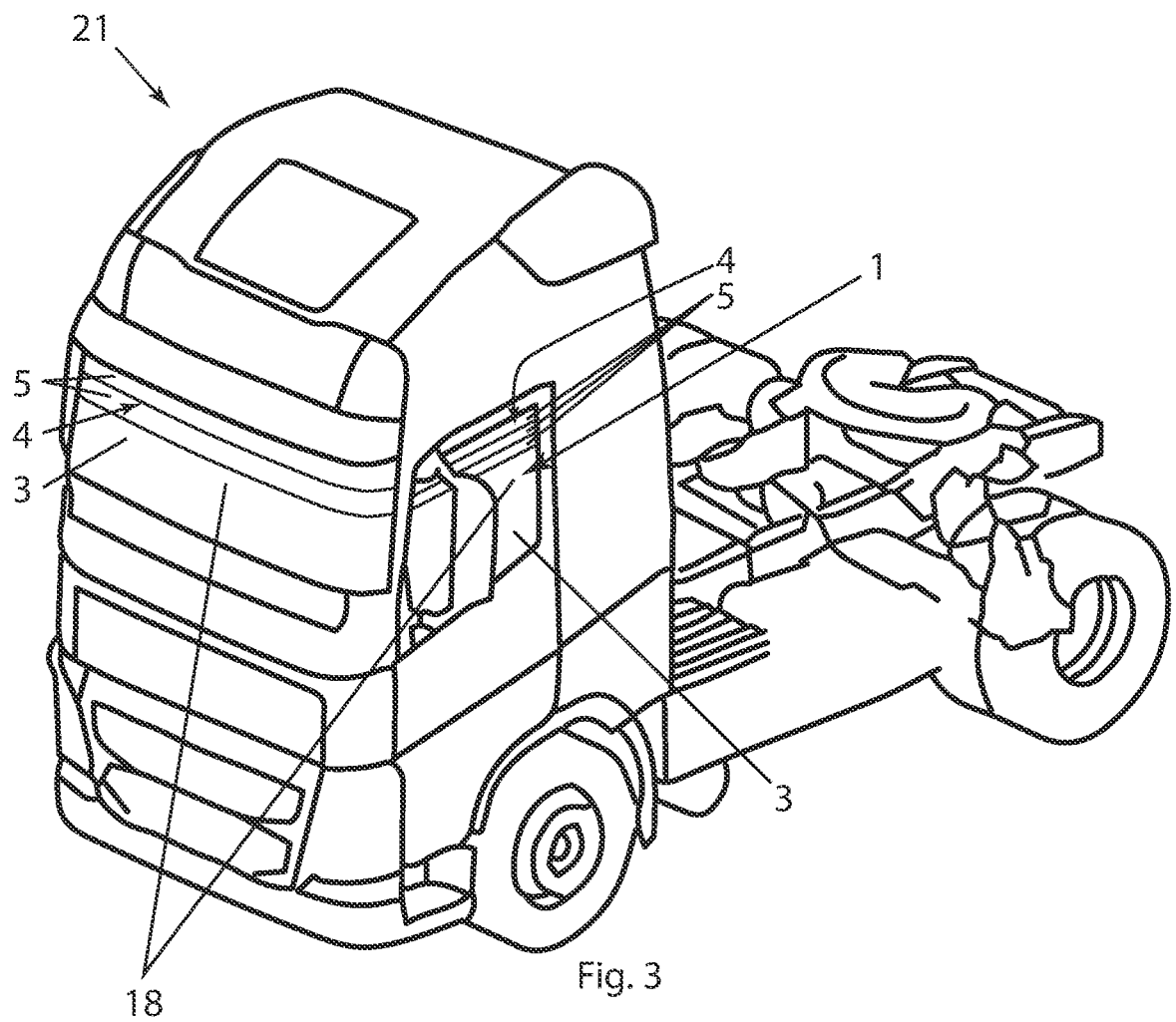
FIG. 3 is a perspective view from above showing a vehicle comprising a vehicle compartment as claimed.
Figure 4:
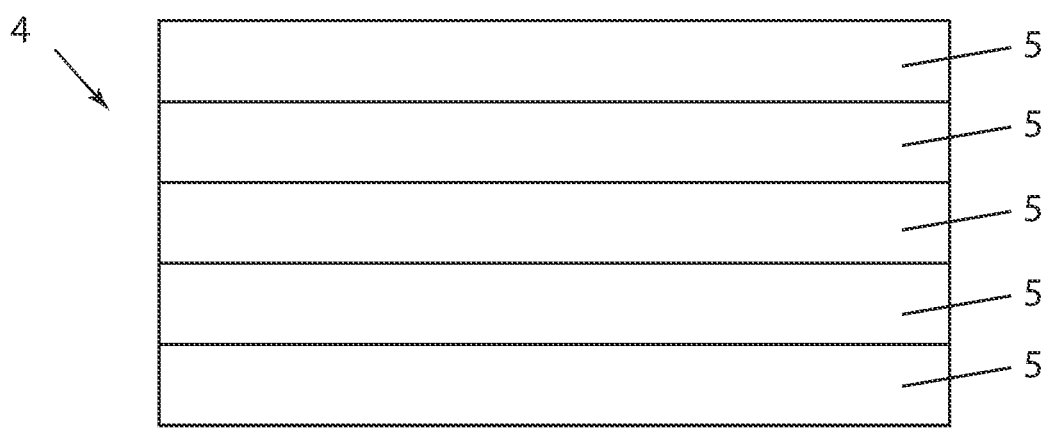
FIG. 4 is a schematic view showing a panel assembly comprising five panels.

As shown in FIGS. 1-2, the vehicle compartment 1 is a portion of the vehicle 21 adapted to accommodate at least one occupant of the vehicle 21. In FIGS. 1-2, the occupant is shown as the driver of the vehicle 21, but the occupant could alternatively or additionally be a passenger. The vehicle compartment 1 has a vertical extent in a vertical direction 2 and comprises a screen 3 through which the occupant can view at least portions of the environment ambient of said vehicle compartment 1. The vehicle compartment 1 further comprises a panel assembly 4 comprising a plurality of panels 5. Each panel 5 in said panel assembly 4 is adapted to adjust the light intensity of light falling into said vehicle compartment 1 via at least a portion of said screen 3, for example by reflecting incoming light, by redirecting/scattering light, or by absorbing light. Also, the vehicle compartment 1 comprises a light sensor 6 adapted to determine an intensity of light falling onto said light sensor 6 via said screen 3. Further, the vehicle compartment 1 comprises a control unit 7 adapted to adjust at least one, preferably each, panel 5 in said panel assembly 4, to thereby adjust the light intensity of light falling into said vehicle compartment 1 via at least a portion of said screen 3, in response to a signal issued from the light sensor 6. The vehicle compartment 1 also comprises a seat 8 for the occupant, said seat 8 being associated with a vertical eye position range 9 indicating within which vertical eye position range 9, in said vertical direction 2, the eyes of said occupant are expected to be located when said occupant occupies said seat 8. The light sensor 6 is located below, in said vertical direction 2, said vertical eye position range 9.

As incoming sunlight shines towards the occupant, an upper portion of the vehicle compartment 1 normally shades the occupant for some time until the shadow on the occupant moves upward as the sun moves to a lower incoming angle relative the travelling direction of the vehicle 21. Hence, the sunlit region of the compartment 1 rises within the vehicle compartment 1 until it finally approaches the eyes of the occupant and blinds the occupant. By providing a light sensor 6 below, in said vertical direction 2, said vertical eye position range 9, the light sensor 6 will receive the incoming sunlight before it risks blinding the occupant. Thereby, a simple and efficient means of mitigating blinding is provided.

The seat 8 comprises a main body 12 and a headrest 13. The headrest 13 is adapted to receive at least a portion of the head of said occupant. The provision of a headrest 13 on the seat 8 enables better control of the position of the head of the occupant during travel and thus enabling a more predictable result of the prediction of blinding. In other embodiments, the headrest may alternatively be omitted.

The headrest 13 is vertically moveable relative to said main body 12 but may in other embodiments alternatively be fixed relative to the main body 12 or integrated with the main body 12. The vertical movability of the headrest 13 enables it to better support and position the head of the occupant, thus enabling a more predictable result of the prediction of blinding.

The headrest 13 comprises a proximal headrest portion 14 and a distal headrest portion 15. The distal headrest portion 15 is located further away from said main body 12 than said proximal headrest portion 14 is, as measured in said vertical direction 2, said light sensor 6 being attached to said proximal headrest portion 14.

In this embodiment, the light sensor 6 is located about 15 cm below said vertical eye position range 9. In other embodiments, the light sensor 6 may alternatively be positioned within a range of 5-40 cm, preferably within a range of 10-20 cm below said vertical eye position range 9. Such a positioning of the light sensor 6 has shown good results for sensing incoming light before it blinds the occupant.

The vehicle compartment 1 further comprises a longitudinal extent in a longitudinal direction 10 being parallel to an intended direction of travel of said vehicle 21. The seat 8 is associated with a longitudinal eye position range 11 indicating within which longitudinal eye position range 11, in said longitudinal direction 10, the eyes of said occupant are expected to be located when said occupant occupies said seat 8. The light sensor 6 is located behind, in said longitudinal direction 10, said longitudinal eye position range 11, but may in other embodiments alternatively be otherwise positioned.

By locating the light sensor behind, in said longitudinal direction 10, said longitudinal eye position range 11, the light detection is made at a position both behind and below the eyes of the occupant, the risk of the sensor getting covered by the arms of the occupant is reduced, thus increasing reliability of the light sensing.

In other embodiments the light sensor 6 may alternatively be attached to a backrest 16 of the main body 12 of the seat 8. This configuration works both for seats 8 with headrest 13 and for seats 8 without headrest. Specifically, the light sensor 6 may be attached to an upper backrest portion 17 in said vertical direction 2 of said backrest 16.

Since the light sensor 6 is attached to the backrest 16, the light sensor 6 will move together with the backrest 16 as the occupant moves the seat 8/backrest 16, for example by forward/rear adjustment or by rotation of the whole seat 8 180 degrees. Hence, the light sensing performed by the light sensor 6 will adapt to the viewing direction and position/orientation of the occupant, thereby improving reliability and consistency of light measurements. By attaching the light sensor 6 to the upper backrest portion 17, the light sensor 6 is located below said vertical eye position range 9, close enough to the occupant's eyes to sense a change between a shaded situation and a sunlit situation, which in turn enables an automated activation of the sunblind prior to the occupant being blinded by the sun.

Each panel 5 in said panel assembly 4 has an adjustable transparency to thereby be adapted to adjust the light intensity of light falling into said vehicle compartment 1 via at least a portion of said screen 3. The control unit 7 is adapted to adjust the transparency of each panel 5 in said panel assembly 4 in response to a signal issued from the light sensor 6.

In this embodiment, each panel 5 has electrically controllable light transmission properties, such as a layer of electrochromic glass or liquid crystal layer or other type of electrically switchable glass, sometimes referred to as smart glass. However, the panel assembly 4 could in other embodiments alternatively comprise any other suitable means enabling the panel assembly 4 to adjust light intensity of light falling into the vehicle compartment 1 via at least a portion of the screen 3, such as a mechanically operable blind (may for example be a roller blind or a pleated blind) or a movable sun visor.

In the embodiment shown in FIGS. 1-3, the vehicle compartment 1 comprises a set of screens 18, said set of screens 18 comprising the windscreen of the vehicle 21, the left-hand side window of the vehicle 21, and the right-hand side window of the vehicle 21 (not visible in FIGS. 1-3).

Each screen 3 of said set of screens 18 comprises a respective panel assembly 4. Each panel assembly 4 comprises a plurality of vertically distributed panels 5 which are individually operable by adjustment of the light transmission of each respective panel 5, thereby enabling the control unit 7 to vertically vary the amount of light transmitted through each respective panel assembly 4. In other embodiments, only one of the screens 3 may be provided with a panel assembly 4, such as the windscreen.

The vehicle compartment 1 comprises a condition sensor 19 adapted to issue a condition signal to said control unit 7, said condition signal being indicative of which screen 3 in said set of screens 18 the occupant of said seat 8 is currently facing. The control unit 7 is adapted to adjust each panel 5 in said panel assembly 4 associated with the screen 3 that the occupant of said seat 8 is currently facing, to thereby adjust the light intensity of light falling into said vehicle compartment 1 via at least a portion of that screen 3, in response to a signal issued from the light sensor 6. The condition sensor 19 enables control of only those panels 5 which are in the direction which the occupant is currently facing such that adjustment of light transmittance needs not be made in all directions simultaneously but only in the direction the occupant faces.

The seat 8 is rotatable/pivotable around a pivot axis 20 parallel to the vertical direction 2 such that an angular position of the seat 8 is alterable. The condition sensor 19 is adapted to determine the angular position of the seat 8 and to issue the condition signal in response to the determined angular position. The angular position of the seat 8 typically corresponds to the viewing direction of the occupant, thereby enabling an easy and reliable means for estimating the viewing direction of the occupant seated in the seat 8.

In other embodiments, the condition sensor 19 could alternatively be configured to determine if the seat 8 is rotated to be positioned in either one of a plurality of predetermined positions, for example by microswitches or other suitable type of sensors at each position. Alternatively, the condition sensor 19 could be one or more camera units adapted to optically monitor the occupant in order to determine the viewing direction of the occupant using image analysis, for example image analysis using feature detection and/or AI. In other embodiments, the condition sensor may alternatively be omitted.

It is to be understood that the present disclosure is not limited to the embodiments described above and illustrated in the drawings; rather, the skilled person will recognize that many changes and modifications may be made within the scope of the appended claims.

EXAMPLES RELATED TO EMBODIMENTS HEREIN

Example 1: A vehicle compartment 1 for a vehicle, said vehicle compartment 1 being adapted to accommodate an occupant of said vehicle,
said vehicle compartment 1 having a vertical extent in a vertical direction 2,
said vehicle compartment 1 comprising a screen 3 through which the occupant can view at least portions of the environment ambient of said vehicle compartment 1,
said vehicle compartment 1 further comprising a panel assembly 4, comprising at least one panel 5, each panel 5 in said panel assembly 4 being adapted to adjust the light intensity of light falling into said vehicle compartment 1 via at least a portion of said screen 3,
said vehicle compartment 1 comprising a light sensor 6 adapted to determine an intensity of light falling onto said light sensor 6 via said screen 3,
wherein said vehicle compartment 1 further comprises a control unit 7 adapted to adjust at least one, preferably each, panel 5 in said panel assembly 4, to thereby adjust the light intensity of light falling into said vehicle compartment 1 via at least a portion of said screen 3, in response to a signal issued from the light sensor 6,
said vehicle compartment 1 further comprising a seat 8 for the occupant, said seat 8 being associated with a vertical eye position range 9 indicating within which vertical eye position range 9, in said vertical direction 2, the eyes of said occupant are expected to be located when said occupant occupies said seat 8,
wherein said light sensor 6 is located below, in said vertical direction 2, said vertical eye position range 9.

Example 2: The vehicle compartment 1 according to example 1, wherein said light sensor 6 is located below said vertical eye position range 9 within a range of 5-40 cm, preferably within a range of 10-20 cm.

Example 3: The vehicle compartment 1 according to any one of example 1 or example 2, wherein said vehicle compartment 1 further comprises a longitudinal extent in a longitudinal direction 10 being parallel to an intended direction of travel of said vehicle, said seat 8 further being associated with a longitudinal eye position range 11 indicating within which longitudinal eye position range 11, in said longitudinal direction 10, the eyes of said occupant are expected to be located when said occupant occupies said seat 8, wherein the light sensor 6 is located behind, in said longitudinal direction 10, said longitudinal eye position range 11.

Example 4: The vehicle compartment 1 according to any one of examples 1-3, wherein said seat 8 comprises a main body 12 and a headrest 13, wherein said headrest 13 is adapted to receive at least a portion of the head of said occupant.

Example 5: The vehicle compartment 1 according to example 4, wherein said headrest 13 is vertically moveable relative to said main body 12.

Example 6: The vehicle compartment 1 according to example 4 or example 5, wherein said headrest 13 comprises a proximal headrest portion 14 and a distal headrest portion 15, wherein said distal headrest portion 15 is located further away from said main body 12 than said proximal headrest portion 14 is, as measured in said vertical direction 2, said light sensor 6 being attached to said proximal headrest portion 14.

Example 7: The vehicle compartment 1 according to example 4 or example 5, wherein said main body 12 comprises a backrest 16 and said light sensor 6 is attached to said backrest 16.

Example 8: The vehicle compartment 1 according to example 7, wherein said backrest 16 comprises an upper backrest portion 17 in said vertical direction 2, said light sensor 6 being attached to said upper backrest portion 17.

Example 9: The vehicle compartment 1 according to any one of examples 1-8, wherein each panel 5 in said panel assembly 4 has an adjustable transparency to thereby be adapted to adjust the light intensity of light falling into said vehicle compartment 1 via at least a portion of said screen 3, said control unit 7 being adapted to adjust the transparency of each panel 5 in said panel assembly 4 to thereby adjust the light intensity of light falling into said vehicle compartment 1 via at least a portion of said screen 3, in response to a signal issued from the light sensor 6.

Example 10: The vehicle compartment 1 according to claim 9, wherein each panel 5 in said panel assembly 4 is located on at least a portion of said screen 3.

Example 11: The vehicle compartment 1 according to any one of examples 1-10, wherein said vehicle compartment 1 comprises a set of screens 18, said set of screens 18 comprising at least two screens 3, through each one of which the occupant is able to view at least portions of the environment ambient of said vehicle compartment 1, said vehicle compartment 1 further comprising a panel assembly 4 for each screen 3 in said set of screens 18, said panel assembly 4 comprising at least a panel 5, located on at least a portion of said screen 3, each panel 5 in said panel assembly 4 being adapted to adjust the light intensity of light falling into said vehicle compartment 1 via at least a portion of said screen 3.

Example 12: The vehicle compartment 1 according to example 11, wherein said vehicle compartment 1 comprises a condition sensor 19 adapted to issue a condition signal to said control unit 7, said condition signal being indicative of which screen 3 in said set of screens 18 the occupant of said seat 8 is currently facing, said control unit 7 being adapted to adjust each panel 5 in said panel assembly 4 associated with the screen 3 that the occupant of said seat 8 is currently facing, to thereby adjust the light intensity of light falling into said vehicle compartment 1 via at least a portion of that screen 3, in response to a signal issued from the light sensor 6.

Example 13: The vehicle compartment 1 according to example 12, wherein said seat 8 is pivotable around a pivot axis 20 parallel to said vertical direction 2 such that an angular position of said seat 8 is alterable, said condition sensor 19 being adapted to determine said angular position and to issue said condition signal in response to said determined angular position.

Example 14: A vehicle 21 comprising a vehicle compartment 1 according to any one of examples 1-13.

| Table of reference numerals | |
|---|---|
| 1 | vehicle compartment |
| 2 | vertical direction |
| 3 | Screen |
| 4 | panel assembly |
| 5 | panel |
| 6 | light sensor |
| 7 | control unit |
| 8 | seat |
| 9 | vertical eye position range |
| 10 | longitudinal direction |
| 11 | longitudinal eye position range |
| 12 | main body |
| 13 | headrest |
| 14 | proximal headrest portion |
| 15 | distal headrest portion |
| 16 | backrest |
| 17 | upper backrest portion |
| 18 | set of screens |
| 19 | condition sensor |
| 20 | pivot axis |
| 21 | vehicle |

The invention claimed is:

1. A vehicle compartment for a vehicle, said vehicle compartment being adapted to accommodate an occupant of said vehicle,
   said vehicle compartment having a vertical extent in a vertical direction,
   said vehicle compartment comprising a screen through which the occupant can view at least portions of the environment ambient of said vehicle compartment,
   said vehicle compartment further comprising a panel assembly, comprising at least one panel, each panel in said panel assembly being adapted to adjust the light intensity of light falling into said vehicle compartment via at least a portion of said screen,
   said vehicle compartment comprising a light sensor adapted to determine an intensity of light falling onto said light sensor via said screen,
   wherein said vehicle compartment further comprises a control unit adapted to adjust at least one panel in said panel assembly, to thereby adjust the light intensity of light falling into said vehicle compartment via at least a portion of said screen, in response to a signal issued from the light sensor,
   said vehicle compartment further comprising a seat for the occupant, said seat being associated with a vertical eye position range indicating within which vertical eye position range, in said vertical direction, the eyes of said occupant are expected to be located when said occupant occupies said seat,
   characterized in that said light sensor is located below, in said vertical direction, said vertical eye position range,
   wherein said light sensor is located below said vertical eye position range within a range of 10-20 cm,
   wherein said seat comprises a main body and a headrest,
   wherein said headrest is adapted to receive at least a portion of the head of said occupant,
   wherein said light sensor is attached to one of a backrest of the main body and a proximal headrest portion of the headrest and, wherein a distal headrest portion of the headrest is located vertically further away from said main body than said proximal headrest portion.

2. The vehicle compartment according to claim 1, wherein said vehicle compartment further comprises a longitudinal extent in a longitudinal direction being parallel to an intended direction of travel of said vehicle, said seat further being associated with a longitudinal eye position range indicating within which longitudinal eye position range, in said longitudinal direction, the eyes of said occupant are expected to be located when said occupant occupies said seat, wherein the light sensor is located behind, in said longitudinal direction, said longitudinal eye position range.

3. The vehicle compartment according to claim 1, wherein said light sensor is attached to the backrest of the main body, and
   wherein said headrest is vertically moveable relative to said main body.

4. The vehicle compartment according to claim 1, wherein said backrest comprises an upper backrest portion in said vertical direction, said light sensor being attached to said upper backrest portion.

5. The vehicle compartment according to claim 1, wherein each panel in said panel assembly has an adjustable transparency to thereby be adapted to adjust the light intensity of light falling into said vehicle compartment via at least a portion of said screen, said control unit being adapted to adjust the transparency of each panel in said panel assembly to thereby adjust the light intensity of light falling into said vehicle compartment via at least a portion of said screen, in response to a signal issued from the light sensor.

6. The vehicle compartment according to claim 5, wherein each panel in said panel assembly is located on at least a portion of said screen.

7. The vehicle compartment according to claim 1, wherein said vehicle compartment comprises a set of screens, said set of screens comprising at least two screens, through each one of which the occupant is able to view at least portions of the environment ambient of said vehicle compartment, said vehicle compartment further comprising a panel assembly for each screen in said set of screens, said panel assembly comprising at least a panel, located on at least a portion of said screen, each panel in said panel assembly being adapted to adjust the light intensity of light falling into said vehicle compartment via at least a portion of said screen.

8. The vehicle compartment according to claim 7, wherein said vehicle compartment comprises a condition sensor adapted to issue a condition signal to said control unit, said condition signal being indicative of which screen in said set of screens the occupant of said seat is currently facing, said control unit being adapted to adjust each panel in said panel assembly associated with the screen that the occupant of said seat is currently facing, to thereby adjust the light intensity of light falling into said vehicle compartment via at least a portion of that screen, in response to a signal issued from the light sensor.

9. The vehicle compartment according to claim 8, wherein said seat is pivotable around a pivot axis parallel to said vertical direction such that an angular position of said seat is alterable, said condition sensor being adapted to determine said angular position and to issue said condition signal in response to said determined angular position.

10. A vehicle comprising a vehicle compartment according to claim 1.

* * * * *